(12) United States Patent
Liu et al.

(10) Patent No.: US 11,360,982 B1
(45) Date of Patent: Jun. 14, 2022

(54) DATABASE ENDPOINT DEVICES PUT IN GROUPS FOR RESPONDING TO QUERIES

(71) Applicant: International Business Machines Corporation, Armonk, NY (US)

(72) Inventors: Xin Peng Liu, Beijing (CN); Shuo Li, Beijing (CN); Xiaobo Wang, Beijing (CN); Sheng Yan Sun, Beijing (CN); Yue Wang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/129,987

(22) Filed: Dec. 22, 2020

(51) Int. Cl.
*G06F 16/2455* (2019.01)
*G06F 1/3206* (2019.01)
*G06F 16/242* (2019.01)
*G06F 16/28* (2019.01)

(52) U.S. Cl.
CPC ........ *G06F 16/2456* (2019.01); *G06F 1/3206* (2013.01); *G06F 16/2433* (2019.01); *G06F 16/284* (2019.01)

(58) Field of Classification Search
CPC .............. G06F 16/2456; G06F 1/3206; G06F 16/2433; G06F 16/284
See application file for complete search history.

(56) References Cited

U.S. PATENT DOCUMENTS

| 2003/0182276 | A1 | 9/2003 | Bossman | |
| 2006/0218123 | A1 | 9/2006 | Chowdhuri | |
| 2009/0327216 | A1 | 12/2009 | Brown | |
| 2010/0223253 | A1 | 9/2010 | Gopal | |
| 2012/0331477 | A1* | 12/2012 | Zeighami | H04L 41/0893 718/104 |
| 2013/0212086 | A1* | 8/2013 | Burger | G06F 16/24542 707/718 |
| 2014/0236890 | A1* | 8/2014 | Vasan | G06F 16/27 707/610 |
| 2015/0150086 | A1* | 5/2015 | Clark | H04L 67/1004 726/3 |
| 2015/0317359 | A1* | 11/2015 | Tran | G06F 16/24542 707/718 |
| 2016/0170469 | A1* | 6/2016 | Sehgal | G06F 9/505 713/320 |
| 2017/0103092 | A1 | 4/2017 | Hu | |
| 2017/0250567 | A1* | 8/2017 | Forbes, Jr. | H02J 13/00007 |
| 2018/0039671 | A1 | 2/2018 | Yang | |
| 2018/0176154 | A1* | 6/2018 | Sigoure | H04L 49/50 |
| 2019/0095493 | A1* | 3/2019 | Bhattacharjee | G06F 7/5324 |
| 2019/0265906 | A1* | 8/2019 | Iyengar | G06F 3/0611 |
| 2020/0026548 | A1* | 1/2020 | Huang | G06F 9/466 |
| 2021/0294801 | A1* | 9/2021 | Pal | G06F 16/2425 |

OTHER PUBLICATIONS

Herodotou et al., "Query Optimization Techniques for Partitioned Tables", SIGMOD'11, Jun. 12-16, 2011, Athens, Greece, 12 Pages.

* cited by examiner

*Primary Examiner* — Cam Y T Truong
(74) *Attorney, Agent, or Firm* — David B. Woycechowsky

(57) ABSTRACT

Leveraging the competence of a computing cluster and a storage cluster by dynamically adjusting an SQL (structured query language) execution path to optimize system performance with fast response time under a distributed relational database on a data storage platform. Also, endpoint devices are divided into groups for the purpose of responding to queries and/or query blocks. The most suitable group of endpoint devices is chosen to respond to a given query or query block.

3 Claims, 3 Drawing Sheets

ABASE ENDPOINT DEVICES PUT IN
GROUPS FOR RESPONDING TO QUERIES

BACKGROUND

The present invention relates generally to the field of database type data storage computer systems and more particularly to the use of endpoint devices in database type data storage computer systems.

The Wikipedia entry for "JOIN (SQL (structured query language))" (as of 19 Oct. 2020) states, in part, as follows: "An SQL join clause—corresponding to a join operation in relational algebra—combines columns from one or more tables in a relational database. It creates a set that can be saved as a table or used as it is. A JOIN is a means for combining columns from one (self-join) or more tables by using values common to each. ANSI (American National Standards Institute)-standard SQL specifies five types of JOIN: INNER, LEFT OUTER, RIGHT OUTER, FULL OUTER and CROSS. As a special case, a table (base table, view, or joined table) can JOIN to itself in a self-Join. A programmer declares a JOIN statement to identify rows for joining. If the evaluated predicate is true, the combined row is then produced in the expected format, a row set or a temporary table."

The Wikipedia entry for "Shard (database architecture)" (as of 19 Oct. 2020) states, in part, as follows: "A database shard, or simply a shard, is a horizontal partition of data in a database or search engine. Each shard is held on a separate database server instance, to spread load. Some data within a database remains present in all shards, but some appears only in a single shard. Each shard (or server) acts as the single source for this subset of data. Horizontal partitioning is a database design principle whereby rows of a database table are held separately, rather than being split into columns (which is what normalization and vertical partitioning do, to differing extents). Each partition forms part of a shard, which may in turn be located on a separate database server or physical location."

In some cases, carrying out an SQL query involves performing complex join. A complex join is sometimes handled by using a single shard join technique. In this single shard join technique, the SQL query is sent to just one shard. On the other hand, the complex join might be handled by a cross-shard join. In a cross-shard join, the database computer system fetches some data from a first shard, fetches some data from another shard(s), combines the results and then returns the combined data back to the requester who made the SQL query through the requester's device.

SUMMARY

According to an aspect of the present invention, there is a method, computer program product and/or system for use with a database running on a database computer system that includes a plurality of computers that collectively includes a plurality of computing devices and a plurality of storage devices that performs the following operations (not necessarily in the following order): (i) for each given computer of the plurality of computers, assigns the given computer to at least one group of a plurality of groups; (ii) receives a first database query, including a first query block, that effectively specifies a selected portion of data stored in the database; (iii) determines, by machine logic, which group(s) are most suitable to respond to the first query block to obtain a set of selected group(s); and (iv) uses computers from the set of selected group(s) to respond to the first query block and to thereby obtain first query block results.

DETAILED DESCRIPTION

Figure 1:
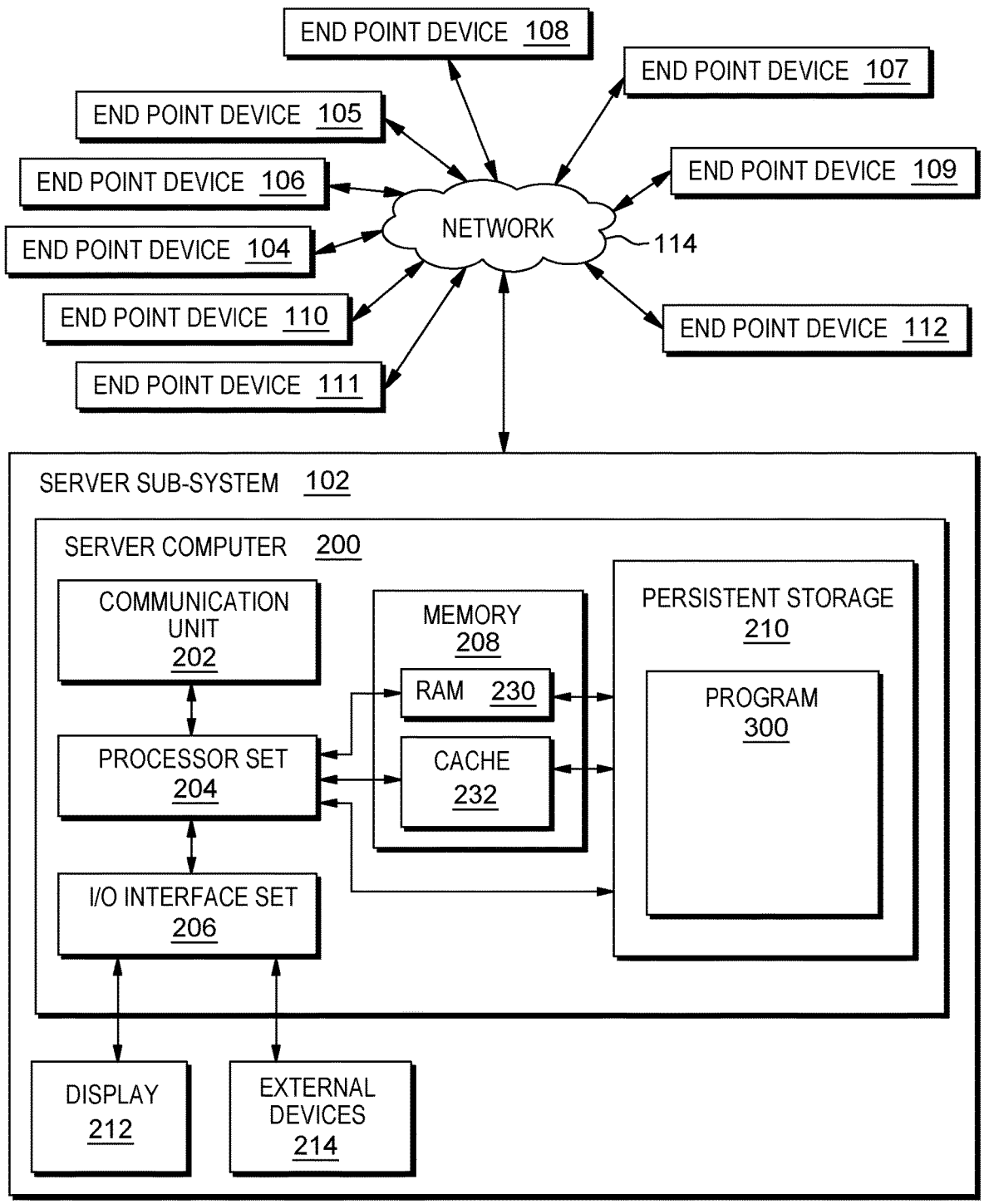
FIG. 1 is a block diagram view of a first embodiment of a system according to the present invention.

Some embodiments of the present invention are directed to leverage the competence of a computing cluster and a storage cluster by dynamically adjusting an SQL (structured query language) execution path to optimize system performance with fast response time under a distributed relational database on a data storage platform. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, database computer system 100 is an embodiment of a hardware and software environment for use with various embodiments of the present invention. System 100 (also sometimes herein referred to as a database type data storage computer system) includes: server subsystem 102 (sometimes herein referred to, more simply, as subsystem 102); endpoint devices 104, 105, 106, 107, 108, 109, 110, 111 and 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
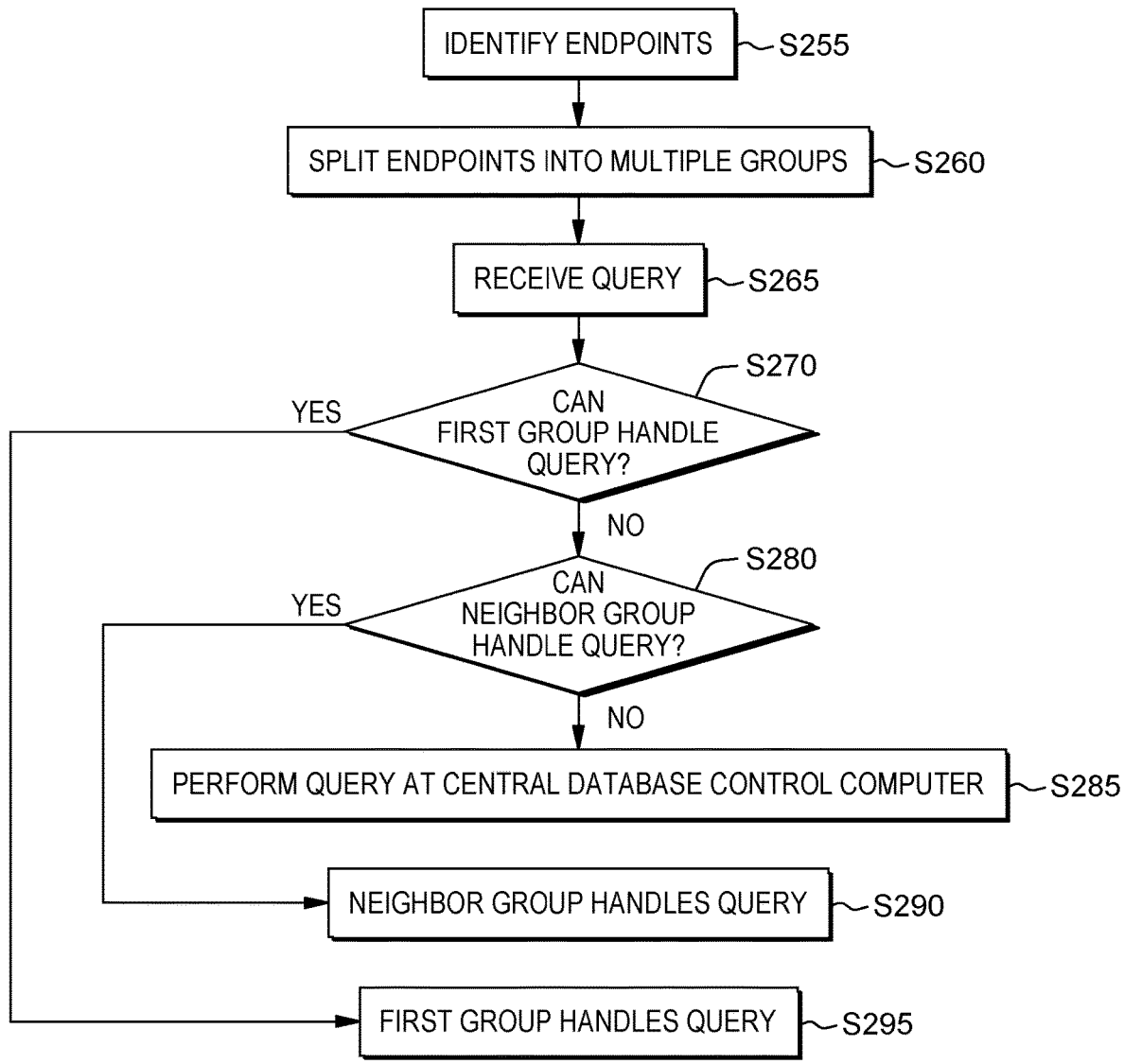
FIG. 2 is a flowchart showing a first embodiment method performed, at least in part, by the first embodiment system.
Figure 3:
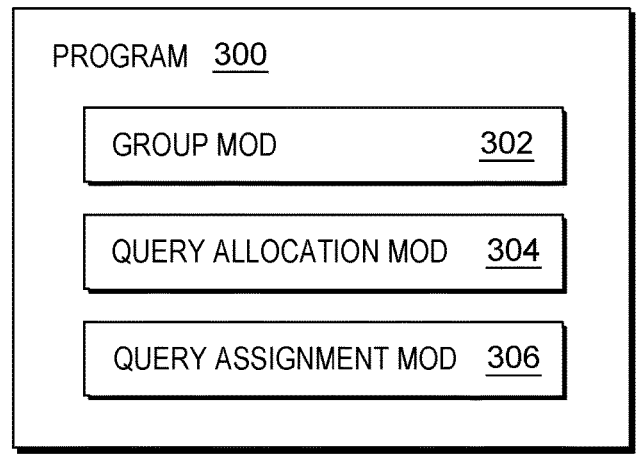
FIG. 3 is a block diagram showing a machine logic (for example, software) portion of the first embodiment system.

As shown in FIG. 1, database computer system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing starts at operation S255 which operates on system 100 which includes: (i) a database (the stored records of data of this relational database is stored in external devices 214 of server subsystem 102); and (ii) multiple computers in the form of endpoint devices 104, 105, 106, 107, 108, 109, 110, 111 and 112. In this example, these endpoint devices collectively include multiple computing devices and multiple storage devices, however, for the sake of simplicity of explanation, this example does not differentiate between the two types of endpoint devices. There is further discussion of these two types of devices (computing and storage) in the next subsection of this Detailed Description section—in some embodiments this may be an important distinction and may influence how query response jobs are allocated to the computing devices that perform them.

At operation S255, group module ("mod") 302 receives an identification of all of the endpoint devices in the system. This identificatory information may be in the form of media access control addressed or the like. In this example, nine (9) endpoint devices are identified for mod 302 as follows: 104, 105, 106, 107, 108, 109, 110, 111 and 112.

Processing proceeds to operation S260, where group mod 302 assigns each endpoint device to one or more groups. In this embodiment, each endpoint device is assigned to only one group. Alternatively, and as further discussed in the next subsection of this Detailed Description section, in some embodiments, a single endpoint device may be assigned to multiple groups and this may lead to certain performance advantages. In this example, the three groups are populated with endpoint devices as follows: (i) Group A includes only endpoint device 104; (ii) Group B includes endpoint devices 105, 106, 107, 108 and 109; and (iii) Group C includes endpoint devices 110, 111 and 112.

Of the three groups identified in the previous paragraph: (i) Group A and Group B are neighbors (the meaning of "neighbors" will become clear in the next subsection of this Detailed Description section); (ii) Groups B and C are neighbors; and (iii) Groups A and C are not neighbors.

Processing begins at operation S265, where query allocation mod 304 receives the first query (in this simple example, the first query includes only one query block). The first query is directed to obtaining selected information from the database (located in external device(s) 214 of server subsystem 102). For example, the query may be written according to a syntax, like SQL (structured query language), or in natural language according to any format now known or to be determined in the future. The first query is received from a requester device (not shown in FIG. 1) and over communication network 114. Each query block within an SQL query that contains multiple blocks is characterized by syntax and/or formatting as shown in the following example of a two block SQL query:

SELECT A.C1
FROM T1 AS A
WHERE A.C2 IN (SELECT B.C1
   FROM T2 AS B
   WHERE B.C3<=5)

The foregoing SQL query includes two (2) query blocks. If mod 304 did receive a query like this then it would split the query into two blocks and the following operations would be performed separately and independently for each of the two blocks of the two block query.

Processing proceeds to operation S270 where the machine logic of mod 304 determines whether Group A (that is endpoint device 104) can handle the first query. As may be explained in the next subsection, this determination may depend primarily on the amount of power consumption that would be occasioned if a given group of endpoint devices were to handle the query.

FIRST BRANCH: Mod 304 determines that Group A is best suited to handle the first query. Processing proceeds to operation S295, where query assignment mod 306 assigns the first query to be performed by Group A (that is, endpoint device 104).

SECOND BRANCH: Mod 304 determines that Group A is not best suited to handle the first query. Processing proceeds to operation S280, where the machine logic of mod 304 determines whether Group B (that is, endpoint devices 105, 106, 107, 108, 109) can best handle the first query. Again, this determination may depend primarily on the amount of power consumption that would be occasioned if Group B was chosen to handle the query. It is noted that Group B is considered because it is a neighbor group of Group A. Group C is never considered, at least in this particular example method, because it is not a neighbor group of Group A.

SECOND BRANCH (continued): Mod 304 determines that Group B is best suited to handle the first query. Processing proceeds to operation S290, where query assignment mod 306 assigns the first query to be performed by Group A (that is, endpoint device 104).

THIRD BRANCH: Mod 304 determines that Group B is not best suited to handle the first query. Processing proceeds to operation S285, where the machine logic of mod 304 determines that none of the groups of endpoint devices are suitable for performing the first query. This means that mod 306 assigns the performance of the query to a central database control computer (in this example, server computer 200).

III. Further Comments and/or Embodiments

A method according to an embodiment of the present invention includes the following operations (not necessarily in the following order): (i) leverages the competence of computing clusters and storage clusters; (ii) dynamically adjusts SQL (structured query language) execution paths in milliseconds to optimize system performance with fast response time under distributed relational databases on a cloud platform; (iii) divides an SQL into query blocks and generates multiple candidate access paths against a query block where a "cross shard" JOIN (join operation in relational algebra) operation is involved to: (a) generate access paths which are orientated during computing cluster execution, and (b) generates access paths which are orientated during a storage cluster execution; (iv) monitors performance indicators (for example, system workload intensity, network situation, etc.) against computing clusters and storage clusters and performs the following operations: (a) when a computing cluster is under high intensive workload, dynamically "pushes down" the access path by switching the storage cluster-oriented access path, (generated from operation (iii) (b) above), during single SQL execution, and (b) when the storage cluster is under high intensive workload, dynamically "pop ups" an access path by switching the computing cluster-oriented access path (generated from operation (iii) (a) above), during single SQL execution; (v) dynamically builds a redundant "work file" (based on data with a specific range in a table) which is frequently accessed using SQLs, and distributes it into multiple shards to avoid a "cross shard" JOIN operation; (vi) dynamically builds a "join buffer" based on the columns of the JOIN predicate with a specific range, which is frequently accessed using SQLs, and distributes it into multiple shards to perform a "pre-join" operation so that the number of moving data points among shards will be significantly reduced; and (vii) cross locks a "redundant work file" and/or a "join area" when corresponding data, with a specific range, is modified and updated to reflect the value in both the "redundant work file" and/or the "join area" accordingly.

Some embodiments of the present invention may include one, or more, of the following operations, features, characteristics and/or advantages: (i) leverages the competence of a computing cluster and a storage cluster under a distributed relational database on a cloud platform; and/or (ii) dynamically adjusts an SQL execution path, against currently running SQL statements in a database runtime, by utilizing a fast response time to optimize system performance.

Some embodiments of the present invention recognize the following facts, potential problems and/or potential areas for improvement with respect to the current state of the art: (i) currently, databases are widely used everywhere; (ii) using traditional methods, devices connect to a relation database or a distributed database; (iii) the power of endpoints have become stronger and stronger, but most endpoints are not utilized enough; and/or (iv) databases have to handle a lot of requirements from the endpoints, but the power of the endpoints are not fully utilized.

Some embodiments of the present invention may include one, or more, of the following operations, features, characteristics and/or advantages: (i) introduces a method to build a group level system to utilize the potential power of endpoints; (ii) in some situations (for example, when a mobile device application is used to make a query about information), the information may be stored in a database; and/or (iii) users can select information that could be shared with other users.

Some embodiments of the present invention may include one, or more, of the following operations, features, characteristics and/or advantages, and may be divided into the following functions: (i) caches hot data for users where: (a) the data which may be accessed by the users, (b) the data could be shared with small groups, (c) reduces connections to the databases, and/or (d) releases pressure on information centers; (ii) pushes some of the database function down where: (a) some of the database function may incur a lot of CPU cost; and/or (b) pushes some of the calculations to the endpoints (for example, if the query contains "ORDER BY", the database may return the unsorted data, and the endpoint device could sort the data to reduce the pressure on the database); (iii) divides the endpoints into groups where: (a) endpoints could be divided into several groups, and/or (b) when lower layers of the groups do not contain the desired information, or only contain part of the information, the requests could be sent to higher layers to decide whether the information is in the neighbor group or needs to be sent to a central database; (iv) virtually and dynamically changes the group combination where: (a) the group deviation is not static, and/or (b) with changing requirements, the group could be combined together or re-divided; (v) the same endpoints could be set in different subgroups; and/or (vi) the data and function calculation could be scattered into a number of endpoints, which will help to reduce the pressure on database services.

Some embodiments of the present invention may include one, or more, of the following operations, features, characteristics and/or advantages: (i) an endpoint could be divided into several groups; (ii) an endpoint could be included in different groups; (iii) an endpoint in different groups could transfer information between groups; (iv) if the groups contains similar information, very frequently the groups could be merged together; (v) some of the calculations could be pushed into each group where the endpoints could help make the calculations on the original result set; (vi) each endpoint contains some of the information, where the information could be shared in the group or between groups; and/or (vii) the database connections could be reduced resulting in the users getting better service.

Figure 4:
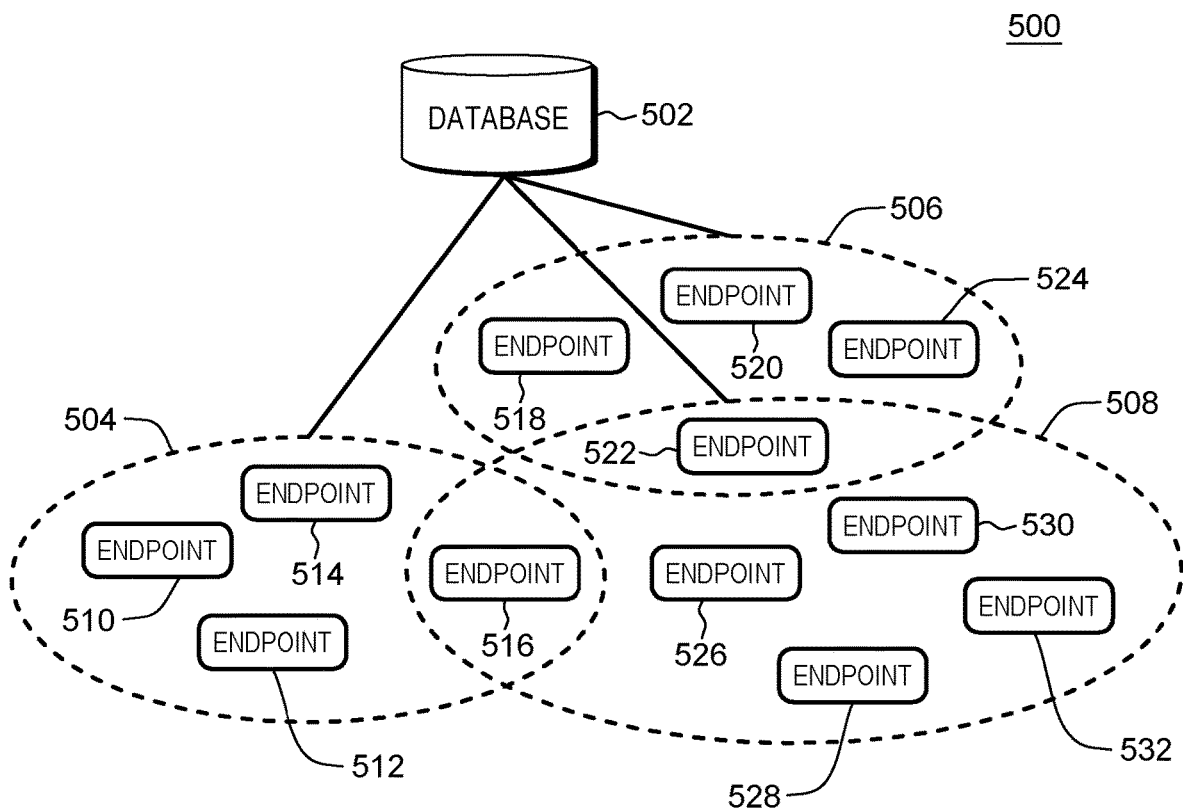
FIG. 4 is a block diagram view of a second embodiment of a system according to the present invention.

As shown in FIG. 4, database computer system 500 includes: database 502; endpoint groups 504, 506, and 508; and individual endpoints 510, 512, 514, 516, 518, 520, 522, 524, 526, 528, 530, and 532.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; an electrical connection may include, but need not be limited to, elements such as capacitors, inductors, transformers, vacuum tubes, and the like.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use with a database running on a database computer system that includes a first computing orientated clusters on a cloud platform and a first storage orientated cluster on the cloud platform, the CIM comprising:

determining that a first computing orientated cluster of the first computing orientated clusters is under high intensive workload and the first storage orientated cluster is not under high intensive workload by monitoring system workload intensity of the first computing orientated cluster and the first storage orientated cluster;

receiving, from a requester device over network, a first database query including a first query block that effectively specifies a selected portion of data stored in the database;

determining, by machine logic, an access path for performing the first query block with the access path specifying the first storage orientated cluster, by dynamically pushing down an access path corresponding to the first computing orientated cluster to a position below an access path corresponding to the first storage orientated cluster to pop up the access path for the first storage orientated cluster; dynamically building a redundant work file based on data with a specific range in a table which is frequently accessed using Structured Query Languages (SQLs); and distributing the redundant work file into multiple shards to avoid a cross shard JOIN operation; and using the first storage orientated cluster to respond to the first query block and to thereby obtain first query block results.

2. The CIM of claim 1 further comprising: dynamically building a join buffer based on columns of a JOIN predicate with a specific range, which is frequently accessed using SQLs; and distributing the join buffer into multiple shards to perform a pre-join operation so that a number of moving data points among shards is reduced.

3. The CIM of claim 1 further comprising: cross locking the join buffer and the redundant work file when corresponding data, with a specific range, is modified and updated to reflect a value in both the redundant work file and join area.

* * * * *